United States Patent [19]

Andreasen et al.

[11] Patent Number: 4,595,576

[45] Date of Patent: Jun. 17, 1986

[54] PROCESS FOR FLUE GAS DESULFURIZATION

[75] Inventors: Jens Andreasen, Espergaerde; James R. Donnelly, Ballerup; Karsten S. Felsvang, Alierod; Ebbe S. Jons, Vaerløse, all of Denmark; Preston L. Veltman, Severna Park, Md.

[73] Assignee: A/S Niro Atomizer, Søborg, Denmark

[21] Appl. No.: 413,419

[22] Filed: Aug. 31, 1982

[30] Foreign Application Priority Data

Sep. 4, 1981 [DK] Denmark .............................. 3912/81
Sep. 8, 1981 [DK] Denmark .............................. 3978/81

[51] Int. Cl.[4] .......................... C01B 17/00; B01J 8/00; C01D 5/00; C01F 11/46
[52] U.S. Cl. .................................... 423/242; 423/166; 423/551; 423/555; 423/DIG. 16; 423/244
[58] Field of Search .......... 423/242 A, 242 R, 244 A, 423/244 R, 166, 551, 555, DIG. 16

[56] References Cited

U.S. PATENT DOCUMENTS

| 3,914,387 | 10/1975 | Jordan et al. ........................ 423/242 |
| 3,985,860 | 10/1976 | Mandelik et al. ................... 423/242 |
| 4,024,220 | 5/1977 | Ostroff et al. ....................... 423/242 |
| 4,081,513 | 3/1978 | Moss ................................... 423/244 |
| 4,108,677 | 8/1978 | Valiga ................................. 106/109 |
| 4,279,873 | 7/1981 | Felsvang et al. .................... 423/242 |

FOREIGN PATENT DOCUMENTS

| 2659289 | 7/1978 | Fed. Rep. of Germany . |
| 2228529 | 6/1974 | France . |
| 2226201 | 11/1974 | France . |
| 2021086 | 11/1979 | United Kingdom . |

Primary Examiner—Gregory A. Heller
Attorney, Agent, or Firm—Banner, Birch, McKie & Beckett

[57] ABSTRACT

Spent absorbents resulting from desulfurization of flue gas in a spray drying-absorption process contain substantial amounts of sulfite, e.g. calcium sulfite. Said sulfite is oxidized into sulfate by heating of the spent absorbent in the presence of an oxygen-containing gas, preferably at temperatures of 350°–600° C. Thereby the spent absorbents may be converted into materials having industrial utility.

10 Claims, 3 Drawing Figures

PROCESS FOR FLUE GAS DESULFURIZATION

FIELD OF THE INVENTION

The present invention is directed to an improved process for desulfurization of flue gas of the type in which an aqueous suspension or solution comprising a basic absorbent for sulfur oxides is atomized into the hot flue gas for simultaneous absorption of sulfur oxides present in the flue gas and drying of the atomized droplets thereby producing a powdery by-product in which a substantial part of the sulfur oxides of the flue gas are absorbed. The improvement results in by-products which have wider industrial applicability or which are less harmful to the environment than the by-products of the prior art processes.

BACKGROUND OF THE INVENTION

Processes of the above-indicated type are well known in the art and such processes are described e.g. in U.S. patent specifications No. 4,279,873 and 4,197,278 and in the references cited in said specifications all of which are hereby incorporated by reference.

The absorbent which finds widest application in these desulfurization processes is slaked lime, i.e. calcium hydroxide possibly containing some magnesium hydroxide, but also sodium carbonate and other basic substances come into consideration.

These processes result in a by-product which is a powdery material the composition and structure of which depend on several features such as amount and composition of fly ash in the flue gas to be desulfurized and composition of the selected absorbent, and on operational features such as the temperature in the absorption zones. The use of partial recycling of the by-product for use in the preparation of the absorbent liquid to be atomized, highly influence the structure of the by-product purged from the process.

The sulfur which is removed from the flue gas will be present in the powdery by-product as sulfite and sulfate. Usually the proportion of sulfite is somewhat higher than the proportion of sulfate.

This relatively high sulfite content whether present as sodium, magnesium or calcium sulfite, may however cause some restrictions as to the disposal or industrial utilization of the by-product. Sodium sulfite being highly soluble in water represents a potential risk to subsoil water when disposed and, although calcium sulfite is only slightly water soluble its disposal in nature has somewhere been met with the reluctance of the authorities. Also for the utilization in the cement industry of by-products containing fly ash and obtained using lime as absorbent, the high calcium sulfite content represents a restriction.

SUMMARY OF THE INVENTION

It has now been found that a substantial reduction of the sulfite content in the by-product may be obtained in a desulfurization process as defined in the attached claims. By means of this new process it is possible without undue expenditure as to equipment and operation to obtain a by-product which may either be a marketable product usable in the cement industry or may be easily disposed of.

By heating the sulfite containing spent absorbent by the process according to the invention an exothermic reaction takes place, whereby the sulfite is substantially completely converted into sulfate.

Several measures come into consideration for performing the heating according to the invention. To secure the presence of sufficient oxygen for the oxidation of sulfite into sulfate, it is suitable to heat the spent absorbent while it is suspended in an oxygen containing gas. Preferably the heating is therefore carried out in a fluidized bed apparatus wherein a hot oxygen containing gas serves as fluidizing gas, or the spent absorbent is suspended in a stream of hot oxygen containing gas and entrained therein carried to a collector means e.g. a cyclone, wherein the oxidized spent absorbent is recovered.

BRIEF DESCRIPTION OF THE DRAWINGS

The process according to the invention is further elucidated by the following description which is to be considered in conjunction with the appended drawings in which.

DESCRIPTION OF PREFERRED EMBODIMENTS

Figure 1:
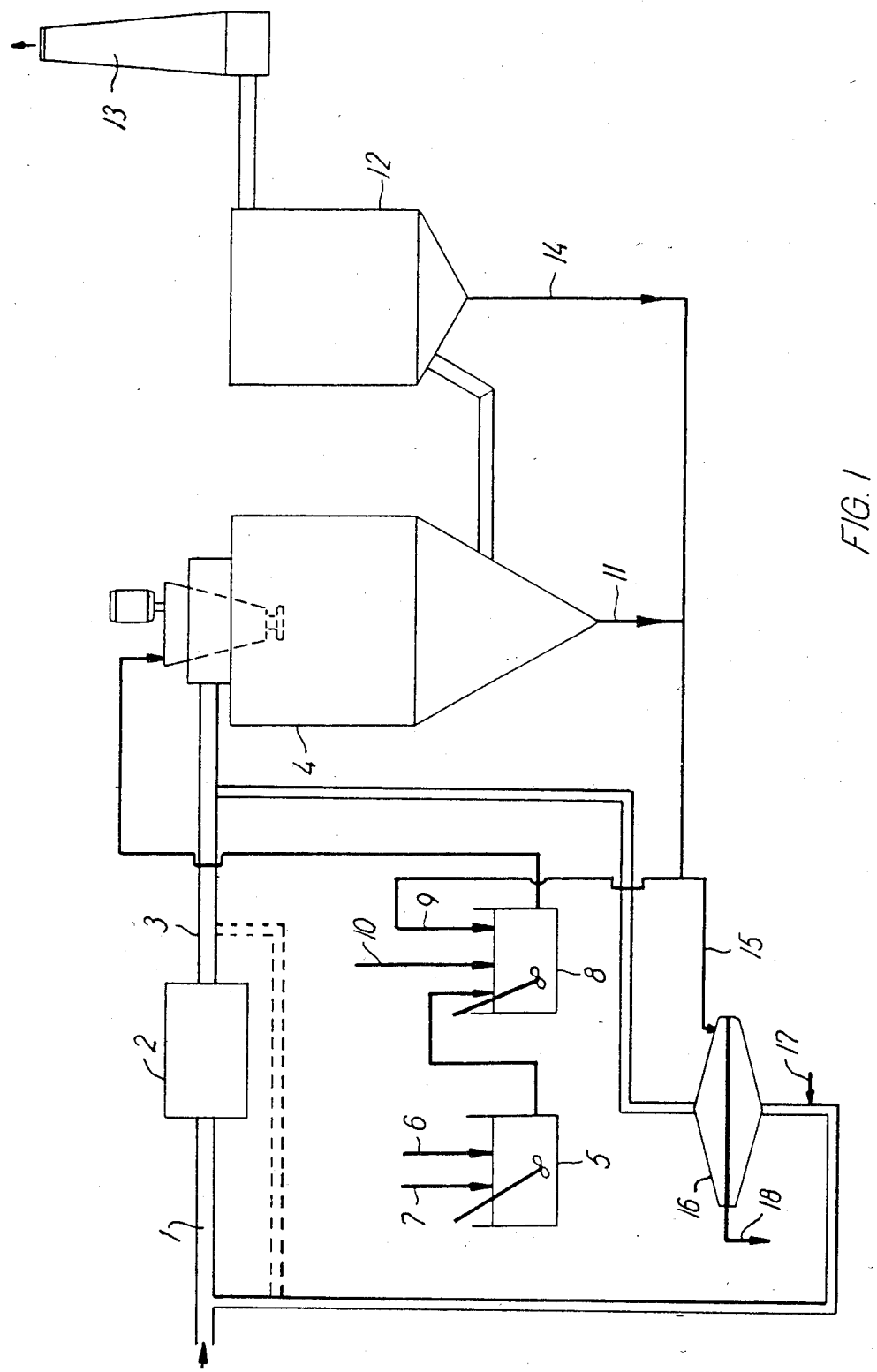
FIG. 1 is a schematic representation of an embodiment comprising all steps of the process according to the invention in which a fluidized bed apparatus is used for the oxidizing heating.

Attention is initially invited to FIG. 1 of the drawings in which 1 represents a duct carrying a stream of hot flue gas to be desulfurized originating from a boiler or the like (not shown). The temperature of the flue gas in duct 1 will typically be 350°–600° C. or higher.

In a heat exchanger 2 said fluid gas is utilized for preheating combustion air for the boiler. Thereby the temperature of the flue gas is reduced, e.g. to app. 150° C.

From the heat exchanger the flue gas is through a duct 3 led to a spray drying-absorption unit 4.

To a slaker 5 is fed quicklime through duct 6 and water through conduit 7. By slaking a $Ca(OH)_2$ suspension is produced in 5 and said suspension is fed to a mixing tank 8.

The tank 8 further receives recycled spent absorbent (as explained below) through conduit 9 and water through conduit 10.

From the mixing tank 8 the aqueous suspension of $Ca(OH)_2$ and recycled spent absorbent is fed to the spray drying-absorption unit 4, wherein it is atomized in the flue gas to be desulfurized.

Thereby a substantial part of the sulfur oxides, mainly $SO_2$, in the flue gas is absorbed by the atomized droplets, which are at the same time dried to a calcium sulfite-containing powder (which in the present specification is termed spent absorbent). A part of the sulfite containing powder produced thereby collects at the bottom of the spray drying unit 4 and is recovered therefrom through conduit 11.

The remaining part of said sulfite containing powder is entrained by the flue gas and conducted with the latter to a dust separator 12, e.g. a bag filter. From the dust separator the purified gas is led to a stack 13.

The spent absorbent separated in 12 is recovered through conduit 14 and is together with the spent absorbent recovered through 11 partly recycled to the mixing tank 8 through conduit 9 while the remaining part or a portion thereof is subject to the special oxidizing heating according to the invention.

Said portion of spent absorbent to be oxidized is through conduit 15 introduced into a fluidized bed apparatus 16 wherein it forms a layer fluidized in a hot gas, which in the embodiment shown consists of a partial stream of the hot flue gas from duct 1 which flue gas has been admixed with an oxidizing gas, e.g. air or oxygen in a more pure state, introduced through conduit 17.

In case the temperature of the flue gas in duct 1 is higher than the desired temperature within the range 350°–600° C. it may be suitable to use a mixture of flue gas from duct 1 and the more cool flue gas from duct 3 for the heating step in the fluidized bed. Said embodiment is illustrated by means of the duct drafted in dotted lines.

From the fluidized bed apparatus 16 the spent absorbent in which a substantial part of the sulfite has been converted into sulfate is recovered through conduit 18 and the fluidizing gas which leaves the fluidized bed apparatus is conducted to duct 3. Since said gas thereby will pass through the dust separator 12 before being released to the stack, a separate dust collector is not necessary to remove entrained particles of spent oxidized absorbent therefrom.

To improve the process as to efficiency of the oxidation promotors may be added to the suspension in the slaker 5 or the mixing tank 8 and/or the oxidizing gas possibly introduced through 17 may comprise gases of high oxidizing potential such as ozone and chlorine.

Obviously numerous variations will be possible of the embodiment described in connection with FIG. 1. Thus a heating system as the one depicted in FIG. 2 may be substituted for the fluidized bed apparatus shown in FIG. 1.

Figure 2:
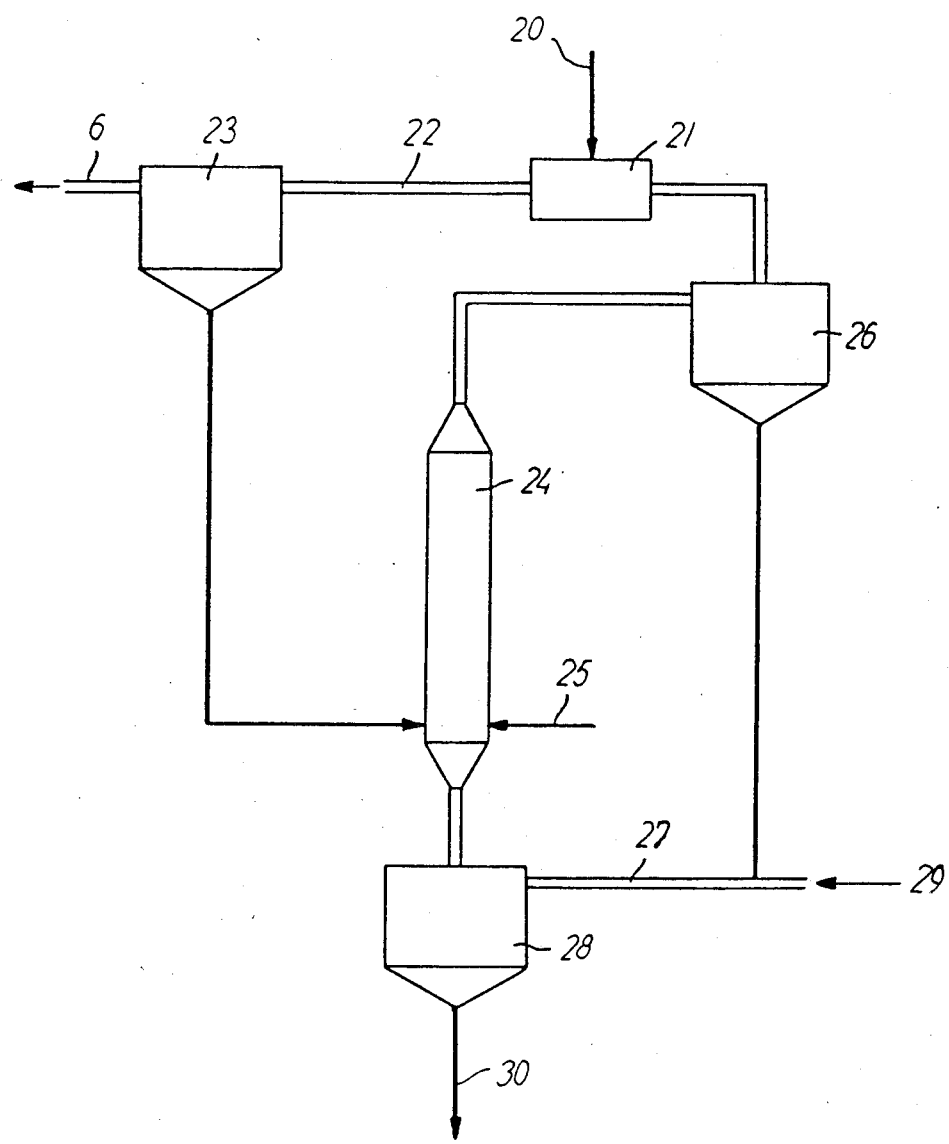
FIG. 2 illustrates an alternative embodiment for performing the oxidizing heating of the spent absorbent in the process of the invention.

In FIG. 2, 20 is a supply of spent sulfite containing absorbent which is let to a mixer 21 by means of which it is suspended in a stream of hot gas (the production of which appears from the below explanation) in a duct 22. Thereby the spent absorbent is preheated to e.g. 200° C.

The duct 22 debouches into a particle collector means 23, e.g. an electrostatic precipitator, a bag house or a cyclone. From said collector means the absorbent collected is at a temperature of app. 200° C. conveyed to the lower end of a heating tower 24 in which it is suspended in a stream of hot air introduced into the bottom part of the heating tower at a temperature of around 400° C.

To increase the temperature the heating tower 24 is provided with means for direct heating of the contents of the heating tower, such as a fuel burner as indicated by 25.

In the heating tower the spent absorbent is subjected to an oxidation whereby a substantial part of the sulfite is converted into sulfate. The temperature in the heating tower reaches a value of up to 600° C., partly due to the heat released by the exothermic oxidation.

From the top of the heating tower the gas entraining the particulate absorbent is conducted to a cyclone 26 in which a substantial part of the absorbent is collected, while the remaining part is entrained in the gas led to the mixer 21 and subsequently collected in 23.

The absorbent collected in the cyclone 26 is conveyed to a supply duct 27 for a second cyclone 28. In said supply duct 27 the hot absorbent is suspended in a stream of fresh air indicated by 29, whereby heat exchange takes place resulting in a heating of the air to a temperature of e.g. 400° C.

From the cyclone 28 the thus heated air together with fine particles of the absorbent is let to the bottom part of the heating tower 24, while the main portion of the treated absorbent is recovered from the cyclone through conduit 30, e.g. as fly ash containing calcium sulfate anhydrate suitable for use in the cement industry or for other purposes.

In the following the invention will be further elucidated by means of examples.

EXAMPLE 1

Flue gas resulting from the combustion of three different coal qualities was desulfurized by a spray drying-absorption process as described in connection with FIG. 1, but with ommision of the oxidizing heating of the spent absorbent recovered through 15. The various parameters of the desulfurization process were within the limits stated in U.S. patent specification No. 4279873. The spent absorbent recovered from the process had the following sulfite and fly ash content:

| Test | Coal type | Sulfite | Fly ash |
|---|---|---|---|
| A | German, Ruhr District | 18% by weight | 35% by weight |
| B | German, Ruhr District | 22% by weight | 55% by weight |
| C | Mixture of Australian and German Coal | 35% by weight | 20% by weight |

Figure 3:
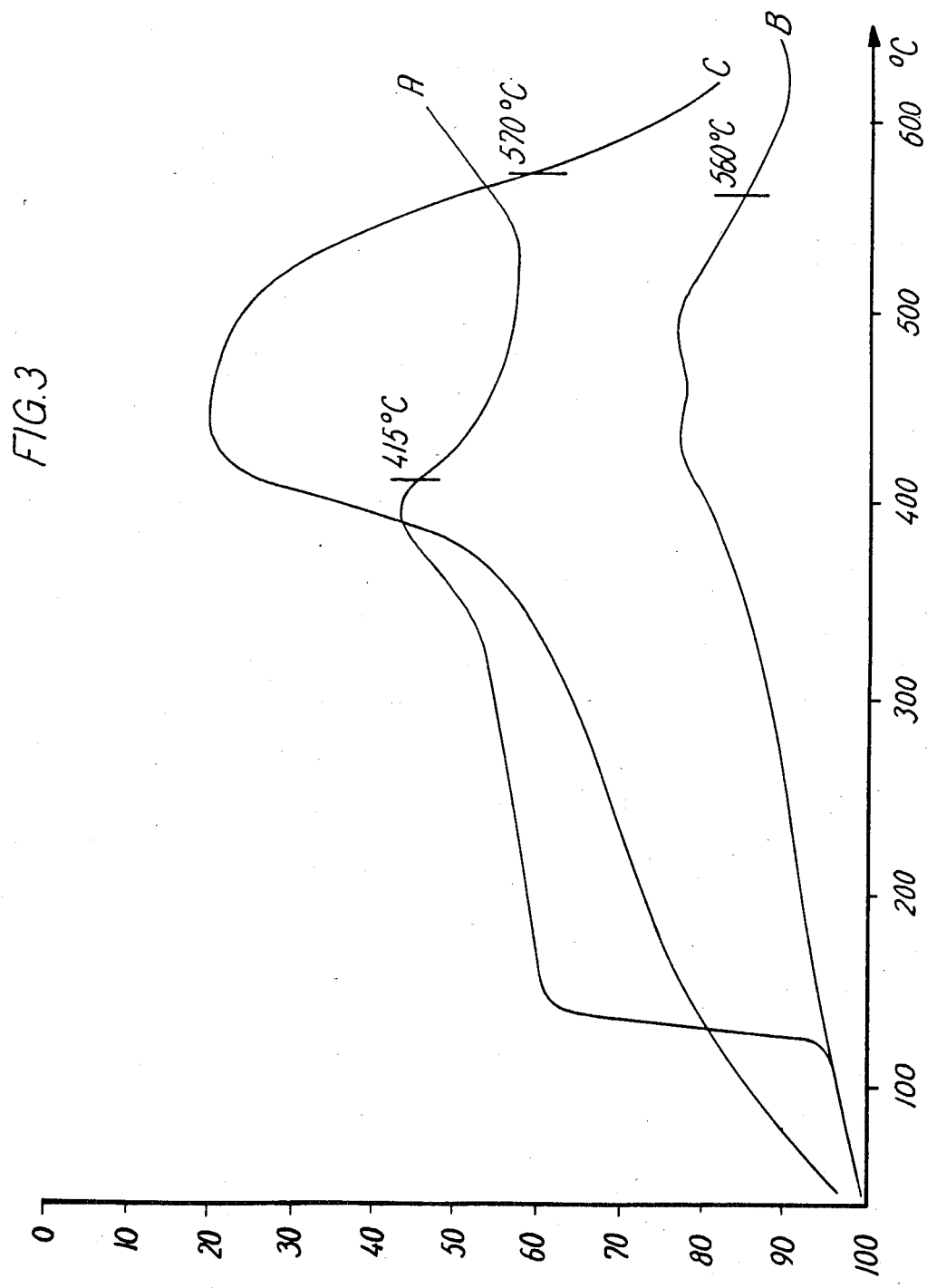
FIG. 3 shows results of thermal gravimetric analysis as explained in Example I.

Samples of these three spent absorbents were subjected to thermal gravimetric analysis (T G A) and the results thereof appear from FIG. 3. On this figure the weight of samples of each of the three qualities of spent absorbent is plotted against the temperature. The weight of the samples was recorded continuously while the temperature was increased 10° C. per minute. An excess of air was present during the heating. The scale 0–100 on the vertical axe corresponds to 20% of the sample weight in case of tests A and B, and to 10% of the sample weight in case of test C.

For each graph in FIG. 3 is indicated a temperature corresponding to a point where deflection of tangent takes place. Said temperatures may be regarded as the lowest temperatures at which a rapid oxidation takes place. It appears that these minimum temperatures for rapid oxidation varies considerably dependent on the nature of the spent absorbent and the temperatures for the three samples in question are as follows:

A 415° C.
B 560° C. and
C 570° C.

EXAMPLE 2

In this example pilot tests were performed on two samples of spent absorbent, viz one sample corresponding to the material used in Test A in Example 1, and one sample corresponding to the material used in Test C of Example 1, but having a somewhat lower sulfite content.

The samples were treated in pilot scale by preheating in a cyclone and thereafter oxidized in a flash calciner as shown in FIG. 2 at the operating conditions shown in the following table which also indicates the degree of oxidation obtained.

|  | German coal | Mixture of Australian and German Coal |
| --- | --- | --- |
| Amount of absorbent treated, kg/h | 12 | 10 |
| Oxidation temp. °C. | 570° C. | 580° C. |
| Gas retention time sec. | 0.8 | 0.8 |
| Powder preheat temp. °C. | 280° C. | 290° C. |
| Initial sulfite content % | 18.5 | 28.0 |
| Sulfite content after oxidation % | 1.2 | 5.2 |
| Degree of oxidation | 0.94 | 0.81 |

The table shows that with both types of spent absorbent a substantial conversion of sulfite into sulfate takes place by the process according to the invention.

We claim:

1. A process for the desulfurization of a hot flue gas comprising:
   (a) atomizing an aqueous suspension or solution comprising a basic absorbent for sulfur oxides into the hot flue gas for simultaneous absorption of sulfur oxides present in the flue gas and drying of the atomized droplets;
   (b) recovering a dry material produced in step (a) containing sulfite and sulfate which material is recovered as a powder also containing any fly ash originally present in the flue gas, and
   (c) heating at least a portion of the recovered powder at a temperature of 350°-600° C. in the presence of an oxygen containing gas containing 5-100% by volume oxygen so as to convert a substantial part of said sulfite into sulfate.

2. The process of claim 1 wherein said heating of the powder is performed in a stream of non-desulfurized flue gas upstream of the location for atomizing absorbent suspension or solution into said flue gas.

3. The process of claim 1 wherein only a portion of said recovered powder is heated in the oxygen-containing gas and subsequently withdrawn from the process for disposal or industrial use, while the remaining powder is recycled for the preparation of the aqueous suspension or solution which is to be atomized.

4. The process of claim 1 wherein said recovered powder contains sulfite and sulfate in a ratio (by weight) between 10/1 and 1/1, which ratio by the heating is reduced to a value between 1/1 and 1/100.

5. The process of claim 1 wherein said heating is performed in a fluidized bed.

6. The process of claim 1 wherein said basic absorbent is an alkaline earth metal hydroxide.

7. The process of claim 1 wherein said basic absorbent is sodium carbonate.

8. A process for desulfurization of flue gas thereby obtaining a by-product of increased sulfate and decreased sulfite content, comprising the steps of
   (a) preparing an aqueous suspension or solution containing a basic absorbent for sulfur oxides;
   (b) atomizing said suspension or solution into a a stream of the hot flue gas;
   (c) collecting a dry powder comprising materials formed by drying and absorption in step (b) and any fly ash present in the flue gas;
   (d) withdrawing a partial stream of hot flue gas upstream of the location for atomizing the suspension or solution, said partial stream having a temperature of 350°-600° C.;
   (e) suspending a portion of the powder collected in step (c) in the partial stream of hot flue gas withdrawn in step (d), allowing an average contact time for the powder of 0,1-90 min.;
   (f) collecting from the partial gas stream at least a substantial part of the powder suspended therein as a by-product of increased sulfate and decreased sulfite content;
   (g) introducing said partial gas stream containing any entrained powder not collected in step (f) into the remaining stream of flue gas upstream of the location for atomizing the suspension; and
   (h) recycling the remaining part of the powder collected in step (c) to the preparation of the solution or suspension in step (a).

9. A process according to claim 1 or 8 wherein a solid promotor selected from the group consisting of calcium chloride and iron compounds is added to said suspension or solution of absorbent.

10. A process according to claim 1 or 8 wherein an oxidizing gas selected from the group consisting of ozone and chlorine is added to the hot gas in which the powder is heated.

* * * * *